Figure 1:
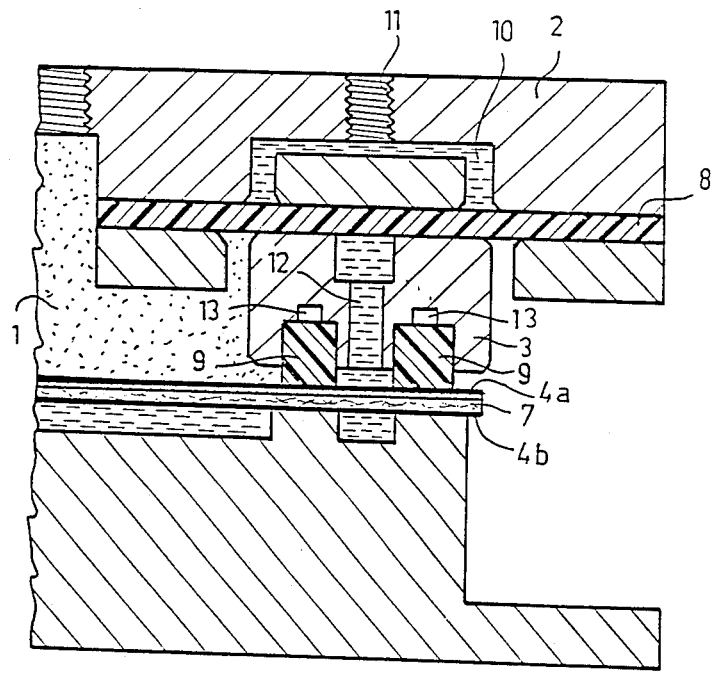

United States Patent [19]

Rautakorpi et al.

[11] Patent Number: 4,787,641
[45] Date of Patent: Nov. 29, 1988

[54] ARRANGEMENT FOR SEALING A CHAMBER CONTAINING PRESSURE MEDIUM

[75] Inventors: Paavo Rautakorpi, Tampere; Pekka Majaniemi, Pirkkala; Jukka Lehtinen, Helsinki, all of Finland

[73] Assignee: Oy Tampella AB, Tampere, Finland

[21] Appl. No.: 136,560

[22] Filed: Dec. 22, 1987

[30] Foreign Application Priority Data

Nov. 2, 1987 [FI] Finland .................... 870569

[51] Int. Cl.⁴ .................... F16J 15/40; F16J 15/46
[52] U.S. Cl. .................... 277/135; 277/DIG. 7; 34/242; 162/371
[58] Field of Search .................... 277/1, 135, DIG. 7; 34/242; 162/371

[56] References Cited

U.S. PATENT DOCUMENTS

| | | | |
|---|---|---|---|
| 2,932,183 | 4/1960 | Richeson | 34/242 X |
| 2,986,911 | 6/1961 | Jackson | 34/242 X |
| 3,460,359 | 8/1969 | Schiffer | 277/DIG. 7 X |
| 3,802,961 | 4/1974 | Grass et al. | 162/371 |
| 3,927,540 | 12/1975 | Tanaka et al. | 277/DIG. 7 X |
| 3,939,576 | 2/1976 | Lawrence | 277/DIG. 7 X |
| 4,058,435 | 11/1977 | Williams | 162/371 |
| 4,545,764 | 10/1985 | Gillies et al. | 34/242 X |

Primary Examiner—Robert S. Ward
Attorney, Agent, or Firm—Nixon & Vanderhye

[57] ABSTRACT

An arrangement for sealing a chamber containing pressure medium against a movable band. The band is arranged to form one side of the chamber. The arrangement comprises a sealing framework which is fastened to a body part of the chamber by means of a resilient membrane. The sealing framework is further provided with a sealing means for providing a sealing effect between the movable band and the rest of the chamber. The sealing means is thereby arranged to be pressed against the band by the pressure effect of a load medium fed on one side of the resilient membrane. In order to obtain an effective and adaptable sealing effect, the means for providing the sealing effect is formed by at least two sealing elements arranged in parallel and between which a sealing liquid is provided.

7 Claims, 1 Drawing Sheet

U.S. Patent  Nov. 29, 1988  4,787,641

ARRANGEMENT FOR SEALING A CHAMBER CONTAINING PRESSURE MEDIUM

The invention relates to an arrangement for sealing a chamber containing pressure medium against a movable band arranged to form one side of the chamber, comprising a sealing framework fastened to a body part of the chamber by means of a resilient membrane, a sealing means being arranged in said sealing framework for obtaining a sealing effect between the movable band and the rest of the chamber, whereby the sealing means is arranged to be pressed against the band by the pressure effect of a load medium to be fed on one side of the resilient membrane.

In connection with wood processing industries, this kind of arrangements are known e.g. from the earlier patent specifications of Tampella. These include the prevention or limitation of the discharge of the steam or air pressure applied in the drying of paper or the like material from the chamber to the space surrounding the machine.

The solution disclosed in Finnish Patent Specification No. 66 041 may be mentioned as an example of the prior art. This prior solution comprises a rigid heavy frame, whereby a great normal force is created between the seal and the movable band, which results in a great power demand and in the generation of plenty of heat. The generation of heat damages the seal and the band. In addition, this prior solution has the disadvantage that the seal has no adaptability and the steam discharging from the chamber causes noise problems.

Other examples to be mentioned are the solutions disclosed in German Offenlegungsschrift No. 3 129 206 and European Patent Application No. 0 126 865. These prior solutions are concerned with the manufacture of chipboard.

The disadvantages of German Offenlegungsschrift No. 3 129 206 include the lack of adjustability, deficient adaptability to variations in the web thickness, noise problems caused by the discharge of steam, and the deficient conveyance of the created friction heat. The disadvantages of European Patent Application No. 0 126 865, in turn, include noise problems caused even by minor steam leakages and difficulties occurring in the conveyance of the created friction heat.

A further disadvantage common to all the three above prior solutions is the problems caused by steam when it is discharged into the space around the machine.

The object of the invention is to provide a solution by means of which the disadvantages of the prior art can be eliminated. This is achieved by means of an arrangement according to the invention which is characterized in that said means for providing a sealing effect is formed by at least two sealing elements arranged in parallel and between which a sealing liquid is provided.

A major advantage of the invention is that the friction, heat, noise and adaptability can be controlled, whereby all the disadvantages of the prior solutions can be eliminated. A further advantage of the invention is the simple realization thereof, so that the operation is reliable and the manufacturing and operating costs are low.

Figure 2:
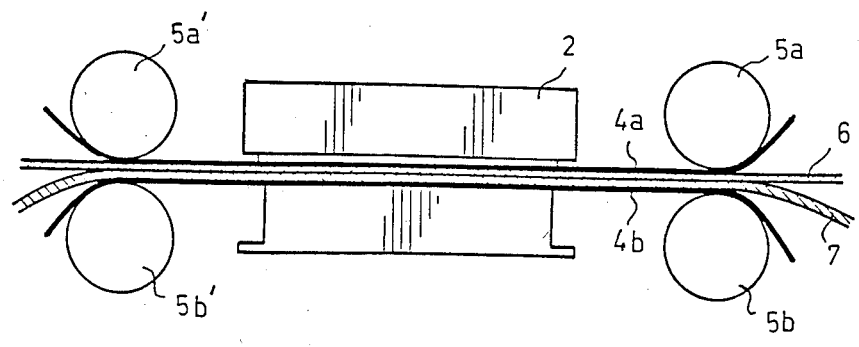

In the following the invention will be described in more detail by means of a preferred embodiment shown in the attached drawing, whereby FIG. 1 is a general cross-sectional view of an arrangement according to the invention seen in the direction of movement of the web, and FIG. 2 is a general side view of a drying means for a paper web in which the arrangement of FIG. 1 is used.

In the example of the figures, the reference numeral 1 indicates a steam chamber. The steam chamber 1 is formed by a body part 2, a sealing framework 3 which is fastened to the body part and which forms the edges of the steam chamber 1, and a band 4a movable with respect to the body part. The band 4a is arranged to extend as an endless loop around rolls 5a and 5a'. This arrangement appears clearly from FIG. 2.

Below this structure another band 4b is arranged which is correspondingly arranged to extend around rolls 5b and 5b' as an endless loop. The loop formed by the band 4b also appears clearly from FIG. 2.

A weblike product 6, such as a paper web, is led between the bands 4a, 4b. The paper web 6 is passed between the bands 4a, 4b on a felt 7. The felt 7 is arranged to rotate as an endless loop as is conventional.

In FIGS. 1 and 2, the lower portion of the structure is shown only generally. The structure of the lower portion may be similar to the structure of the upper portion shown in the figure. Alternatively, it is possible to use a water chamber. The arrangement may thereby be e.g. such as disclosed in Finnish Patent Specification No. 63 078.

The function of the structure shown in the figures is to remove water from the web 6 and to transfer it further away to a suitable place by means of the felt 7. As to the operation, Finnish Patent Specification Nos. 66 041 and 63 078 are referred to. These matters are completely obvious to one skilled in the art, so they are not more closely discussed here.

In the example of FIGS. 1 and 2, the sealing framework 3 is attached to the body part 1 by means of a resilient membrane 8. In order to seal the gap between the band 4a rotating around the roll 5a and the sealing framework 3, two sealing elements 9 arranged in parallel are provided in the sealing framework 3.

The sealing elements 9 are arranged to be pressed against the band 4a by the pressure effect of a pressure medium to be fed into a space 10 defined between the body part 2 and the membrane 8. The pressure medium can be fed into the space 10 through a conduit 11. The pressure in the space 10 may be adjustable.

In addition, a sealing liquid 12 is introduced between the sealing elements 9 for sealing the gap between the sealing elements and the band, the sealing liquid simultaneously acting as a lubricant and as a cooling agent for the elimination of heat problems. The sealing elements 9 are positioned in separate grooves, and in this embodiment the bottoms of said grooves are provided with depressurizing grooves 13. The function of the depressurizing grooves is to reduce the pressure above the sealing element, so that the pressure prevailing below the sealing element is sufficient to keep the sealing element on the bottom of the groove. Thereby the press between the sealing elements and the band can be reduced if required, without any risk of the sealing element being loosed. The press can be reduced by lifting the sealing framework or by reducing the pressure prevailing in the space 10.

If need be, the load of the sealing elements against the band 4a can be unequal. This can be effected e.g. structurally by the use of pressure compensation. It is likewise possible to use a separate load mechanism.

The profiles of the sealing elements 9 may be either similar or dissimilar, and the sealing elements can be manufactured of the same material or different materials.

The sealing liquid 12 can be any suitable liquid. When a gaseous pressure medium, such as steam, is used in the chamber 1, the sealing liquid preferably consists of the condensation liquid of said pressure medium, e.g. water. The sealing liquid arrangement can be effected e.g. by introducing sealing liquid between the sealing elements or alternatively by removing liquid, i.e. steam condensed from the chamber 1, away from between the sealing elements.

The above example arranged in connection with a Condebelt dryer is by no means intended to restrict the invention, but the invention can be modified within the claims in various ways. Accordingly, it is clear that the arrangement according to the invention or the parts thereof need not necessarily be exactly similar to those shown in the figures but other kind of solutions are possible as well. For example, the sealing framework can be fastened to the membrane in any suitable way. Correspondingly, the depressurizing grooves may differ from those shown in the figures or they can differ from each other, so that the load effect of the sealing elements is dissimilar. The seals can also be shaped or fastened so that no depressurizing grooves are needed. The pressure of the chamber 1 can be adjusted by means of any adjustable pressure source. The sealing elements need not, either, be two in number, but it is possible to use more sealing elements.

We claim:

1. An arrangement for sealing a chamber containing pressure medium against a movable band arranged to form one side of the chamber, comprising a sealing framework fastened to a body part of the chamber by means of a resilient membrane, a sealing means being arranged in said sealing framework for obtaining a sealing effect between the movable band and the rest of the chamber, whereby the sealing means is arranged to be pressed against the band by the pressure effect of a load medium to be fed on one side of the resilient membrane, said means for providing a sealing effect being formed by at least two sealing elements arranged in parallel and between which a sealing liquid is provided.

2. An arrangement according to claim 1, wherein the load of the sealing elements against the band is arranged to be unequal.

3. An arrangement according to claim 1, wherein the sealing elements are different in profile.

4. An arrangement according to claim 1, wherein the sealing elements are made of different materials.

5. An arrangement according to claim 1, wherein each one of the sealing elements is positioned in a separate groove the bottom of which is provided with a depressurizing groove.

6. An arrangement according to claim 1, wherein said pressure medium consists of gaseous pressure medium and the sealing liquid consists of the condensation liquid of the pressure medium.

7. An arrangement according to claim 6 for sealing a chamber containing steam, wherein said gaseous pressure medium consists of steam and the sealing liquid consists of water.

* * * * *